F. S. DICKINSON.
PNEUMATIC TIRE.
APPLICATION FILED SEPT. 1, 1915. RENEWED JUNE 25, 1917.

1,235,963.

Patented Aug. 7, 1917.

Witnesses:
Wm H Hawkins
Agnes Lw

Inventor
Fredrick S. Dickinson.
By his Attorney,
J. Rees Little

UNITED STATES PATENT OFFICE.

FREDRICK S. DICKINSON, OF NEW YORK, N. Y.

PNEUMATIC TIRE.

1,235,963. Specification of Letters Patent. Patented Aug. 7, 1917.

Application filed September 1, 1915, Serial No. 48,401. Renewed June 25, 1917. Serial No. 176,779.

*To all whom it may concern:*

Be it known that I, FREDRICK S. DICKINSON, a citizen of the United States, and resident of New York, in the county and State of New York, have invented certain new and useful Improvements in Pneumatic Tires, of which the following is a specification.

This invention relates to pneumatic tires of that class in which the internal body fabric of the shoe or casing is of the "cord" type, and it has particular relation to improved means for anchoring the cord body fabric at the bead or selvage edges thereof.

In the usual construction of cord tires, the length of cord is looped or turned parallel to the annulus of the tire at the bead edge thereof and the portion of the cords extending from said loops are carried over the circumference of the tire at the side and tread portions thereof, and the anchoring of the cords at the bead edge has usually been dependent upon merely the vulcanization by which the cord fabric is amalgamated with the shoe or casing or the turns or loops of the cord parallel to the annulus of the tire at the bead edge have been passed around hooks or staples positioned laterally with relation to the annulus of the tire and embedded in the bead. Such constructions do not maintain the required tension on the cords, owing to the tendency of the latter to assume their natural length, which action ensues by reason of the fact that the first heat of the vulcanizing process softens the rubber compounds sufficiently to permit slippage in the length of the cords. It is therefore desirable that a secure and permanent anchoring means be provided which will effectively and at all times maintain the laid cords at their normal tension.

My invention is particularly adapted for employment in relation to the improved type of cord tire which is shown in my co-pending application Serial No. 10,213, in which the cord body fabric is constituted by a continuous length of cord which is turned or looped at the bead edge at an angle to the annulus of the tire and laid over itself at said turn or loop and spread or diverged therefrom in a gradual and continuous positional relationship in which the under portion of the length of cord gradually emerges from beneath the upper portion and said under and upper portions relatively spread and extend over the space area of the variable circumference of the tire. For an understanding of the general construction of the type of cord tire to which my improved anchoring means are related, reference may be had to the co-pending application above noted.

The object of my invention is to provide an improved anchoring means for the turned or looped length of cord at the bead edge, which will be extremely simple in construction and the number of parts employed, which will effectively and securely maintain the cords at all times at normal tension, which will enable the laying and looping of the length of cord and its attachment with relation to the anchoring bead ring in a rapid and economical operation, and which will furthermore possess advantages in point of security, inexpensiveness, effectiveness, and general efficiency.

A further object of my invention is to provide an improved anchoring means whereby the selvage or bead edge of the cord body fabric will be securely held against all liability of release of the tension of the cords during the process of making the tire, during vulcanization or curing, or when in operative use thereafter.

A further object of my invention is to provide an improved anchoring means whereby the replacement of broken cords may be effected without the necessity of tearing or cutting through the original bead and the resultant necessity of rebuilding the bead, and which will enable the laying of any replaced cords under the same tension as was maintained in the original cords, and to these ends my improvements comprise detachable or separable means carried by the main bead ring, to which detachable means the cords are directly connected, substantially as hereinafter described.

My invention thus comprises a reinforcing bead ring and inextensible anchoring means inserted upon or attachably connected with the bead ring and securing the selvage-edge loops of the cord.

In the drawings—

Corresponding parts in all the figures are denoted by the same reference characters.

Figure 1:
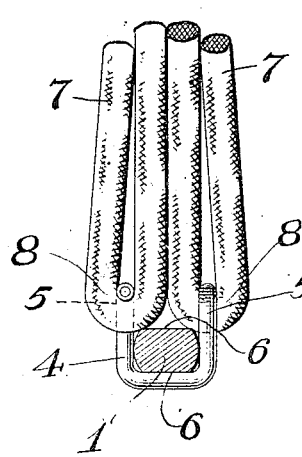
Figure 1 is a detail cross-section of the bead ring and anchoring means, showing the cord loops as anchored to the ring by means of the eyelets.

I have herein illustrated my improved anchoring means in its relation to a two-ply cord body fabric, in which the cord lengths of the respective plies are laid at reverse angles and extend obliquely to the transverse or segmental cross-sectional plane of the tire, but it will be understood that the anchoring means may be adapted to the employment of a single ply cord fabric or to the employment of multiples of the two-ply construction. It will also be understood that in all constructions of the improved anchoring means the bead ring and the anchoring eyelets to which the cord loops are connected are all embedded in the bead of the tire and serve the office of a reinforce therefor.

In the practical construction of the cord body fabric, and the anchoring thereof according to my invention, the length of cord is laid over a suitable core or mandrel or former, at an angle thereto, under any desired tension, and turned or looped upon itself at its selvage or bead edges (for instance, in the manner set forth in my co-pending application above referred to). The anchoring eyelets are then engaged with the cord loop and brought to position to securely anchor the cord at its loop to the bead ring and thus insure the maintenance of uniform tension in each lay of the cord and throughout its entire length as the cord is laid and the successive eyelets are placed in position. The entire operation of laying and anchoring the cords in the manner just set forth is accomplished by means of a mechanism which constitutes the subject matter of a separate application for patent. It will be understood that, in the laying and anchoring of two plies according to my invention as herein set forth, the under ply is first completely laid and anchored, and the next succeeding and overlying ply is correspondingly completely laid and anchored.

Referring to the drawings, 1 designates a metallic bead ring, which is of annular or hoop shape conforming to the annulus of the tire and constitutes the base element of the anchor construction. The bead ring is preferably constructed of steel, rolled or drawn to the desired cross-sectional contour, rolled to the required radius, and then welded at the joint. The ring may, however, be constructed of sheet metal, preferably steel, rolled to impart the desired or suitable cross-sectional contour. In its preferred cross-sectional contour, the bead ring is preferably flattened, to present plane under and upper surfaces, as at 6, which surface is best adapted for the bearing of the eyelets which are mounted upon the ring and to which the bead-edge loops of the length of laid cord constituting the cord body fabric are directly connected. The bead ring thus serves as an inextensible anchor base for the looped edges of the cord body fabric which are secured in connection with the ring by the intermediate anchoring eyelets.

4 designates the anchoring eyelets, which are of metal and may be preferably formed of suitable bent wire. In contour, the eyelet comprises a main or body portion which constitutes an eye and straddles or bridges the bead ring 1, so that the latter is within the eyelet, and from said body portion extend stems, as at 5, which project at opposite sides of the bead ring above the periphery thereof and which are turned or bent to form side eyes with which the loops of the cord are engaged.

From the foregoing, it will be understood that when the length of cord is laid with the looped ends resting upon the bead rings, and the eyelets are engaged with the loops and mounted upon the ring, the relative positions are such that the main portion or body-eye of the eyelets which engages under and straddles the bead ring is at an angle or transverse to the annulus of the tire, the cord-securing eyes of the stems 5—5 of the eyelets are in position parallel to the annulus of the tire, and the bead-edge loops of the length of cord are at an angle or transverse to the annulus of the tire and parallel to the main or body portion of the eyelets.

The anchoring eyelets are positioned upon the bead ring 1 in series and equi-distantly, the intervening space between the eyelets being determined by the thickness or diameter of the cord employed and the diameter of the eyelets. The terminal ends of the stems 5 are initially turned or bent in a direction in line with the main portion or body-eye, and when the loop of the cord is engaged under this end the latter is turned or twisted to a position at right angles to the main portion or body-eye and parallel to the bead ring, thus forming a securing eye between which and the bead ring the cord loop is securely retained. The turned or twisted ends are of proper length to form, in producing the securing eye just mentioned, substantially a closure between the end and next adjoining eyelet, as shown in Fig. 3.

Figure 2:
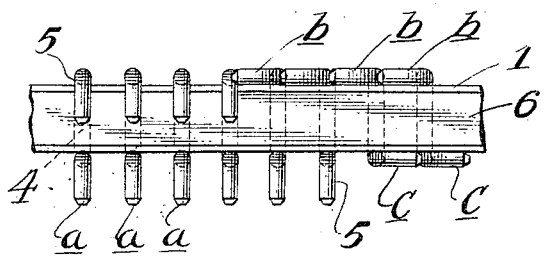
Fig. 2 is a detail plan view of a section or segment of the periphery of the bead ring and anchoring means, corresponding to the construction shown in Fig. 1, the anchoring eyelets being shown in the various successive positions to which they are brought in their office of securing the cord loops, but the cords not being illustrated.

In Fig. 2 I have illustrated the various successive positions to which the anchoring eyelets are brought in their office of securing the cord loops and with relation to two layers of cord fabric. The initial position is represented at a, in which the terminal ends of the stems 5—5 of the eyelets are both bent or turned so that they are projective in the same direction and in line with the main portion or body-eye which extends under and across the bead ring 1 and transverse to the annulus of the tire. In the position just described, the terminal end at the inner side of the eyelet projects outwardly over the bead ring and a proper distance above the latter to accommodate the thickness of the cord loop which is engaged between said end and the periphery of the ring, and the terminal end at the outer side of the eyelet projects outwardly beyond the side of the bead ring. Then, when the loop of the cord of the under ply is engaged with said projecting inner terminal end of the eyelet, the end is turned or twisted to a position in which it is parallel to the bead ring 1 and parallel to the annulus of the tire, which position is indicated at b; and when the loop of the cord of the overlying ply is engaged with the projecting outer terminal end of the eyelet said end is turned or twisted to a position parallel to the bead ring 1 and parallel to the annulus of the tire but in a direction opposite to that at which the inner turned or twisted end of the eyelet projects, which latter position is indicated at c. Under the construction and arrangement just described, in which the eyelets are positioned for anchoring two layers of cord fabric, it will be noted that the terminal turned ends of the stems 5—5 of the eyelets respectively provide an inner and outer series of side eyes, each series being parallel to the bead ring 1 and parallel to the annulus of the tire, by which the looped ends of the cord of the respective under and overlying plies are retained at approximately right angles to the annulus of the tire and substantially in line with the main portion or body-eye of the eyelet which is transverse to the bead ring and at an angle to the annulus of the tire.

Figure 3:
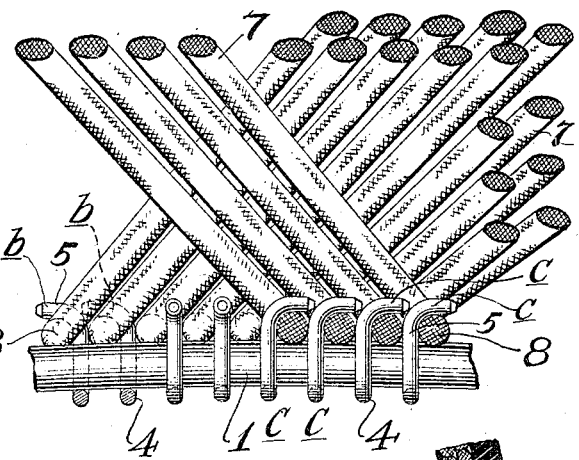
Fig. 3 is a side view of the construction indicated in Fig. 2, illustrating likewise the various positions to which the eyelets are brought in their office of securing the cord loops and also illustrating the placement of the cords of two plies as laid at reverse angles.

It will be understood that, in the laying of two plies as above set forth, the under ply is first completely laid up and anchored by turning or twisting the inner projecting terminal end of the stem 5 of the eyelets to the position above described and around the selvage-edge loop of the cord, and the next succeeding and overlying ply is then correspondingly laid and anchored in the same manner by turning the outer terminal end of the stem 5 of the eyelets in an opposite direction and to the position above described, in which anchored positions the side eyes of the eyelets securely bind or retain the loop of the cord between the turned or bent terminal ends of the eyelets and the periphery of the bead ring 1, as shown in Figs. 1 and 3, the length of cord, 7, of the respective plies passing under and through the eye which is formed by the terminal end of one eyelet and the next adjoining eyelet and laying over itself at the loop, 8, from which it spreads or diverges in a gradual and continuous positional relationship so that the under portion of the length of cord gradually emerges from beneath the upper portion thereof and said under and upper portions relatively spread and extend over the progressive variable circumference of the tire in the laid position as set forth in my co-pending application above noted. As further shown in Fig. 3, the respective plies are laid at reverse angles obliquely or diagonally with relation to the transverse or segmental cross-sectional plane of the tire.

Under some preferred conditions of construction, the bead ring 1 may have a flexible character, in lieu of being formed of metal of solid cross-section or of wire or sheet metal; for instance, it may be constituted by a metallic or textile cable, or of twisted wire or textile material, or a combination of both metallic and textile material.

Figure 4:
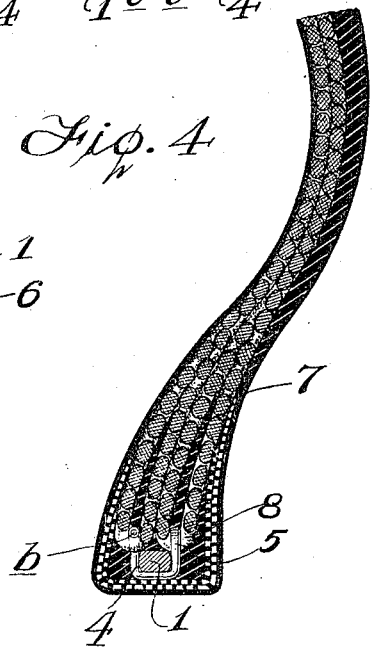
Fig. 4 is a detail cross-section of the bead portion of a completed tire with the anchoring means and cord fabric embedded therein.

In Fig. 4 I have illustrated the bead portion of a completed tire, showing the embedded position of my improved anchoring means and the looped cords at the selvage edge of the cord body fabric after the cords have been laid in the manner hereinbefore set forth and anchored in relation to the bead ring and the anchored structure incorporated in the tire shoe or casing before the vulcanizing process.

The advantages of my invention and the operation of laying the cord fabric and anchoring the loops of the cords at the selvage edge thereof will be readily understood by those skilled in the art to which my improvements appertain. In the improved construction the cords are laced through the anchoring eyelets, with their loops passing through the terminal-end eyes thereof at an angle to the annulus of the tire and in line with the main portion or body-eye of the eyelet which is also at an angle to the annulus of the tire, the terminal-end eyes of the eyelets being approximately parallel to the annulus of the tire and thus substantially at right angles to the loop at which the cord lays over itself and to the main portion or body-eye of the eyelet which extends transversely across and under the bead ring.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In anchoring means for the cord body fabric of tires of the "cord" type, a bead ring member in line with the annulus of the tire, eyelet members carried by the bead ring member and having their securing eyes or portions positioned approximately parallel to the annulus of the tire, and the length of cord turned or looped under said securing portions of the eyelets and laid over itself at said loop at an angle to the annulus of the tire.

2. In anchoring means for the cord body fabric of tires of the "cord" type, a bead ring member in line with the annulus of the tire, eyelet members carried by the bead ring and straddling or bridging the same and having their terminal ends forming eyes or securing portions positioned approximately parallel to the annulus of the tire, and the length of cord turned or looped under said ecuring portions of the eyelets and laid over itself at said loop at an angle to the annulus of the tire.

3. In anchoring means for the cord body fabric of tires of the "cord" type, a bead ring member in line with the annulus of the tire, eyelet members carried by the bead ring and having a main portion straddling or bridging the same transversely of the annulus of the tire and terminal ends forming eyes or securing portions positioned approximately parallel to the annulus of the tire, and the length of cord turned or looped under said securing portions of the eyelets and laid over itself at said loop at an angle to the annulus of the tire.

4. In anchoring means for the cord body fabric of tires of the "cord" type, a bead ring member in line with the annulus of the tire, eyelet members carried by the bead ring member in spaced series and having their terminal ends in projective position approximately parallel to the annulus of the tire, the spaced position being such that said end of one eyelet in conjunction with the next adjoining eyelet forms substantially a closure or securing eye, and the length of cord turned or looped through said securing eyes and laid over itself at said loop at an angle to the annulus of the tire.

5. In anchoring means for the cord body fabric of tires of the "cord" type, eyelet members having their securing eyes or portions positioned approximately parallel to the annulus of the tire, a base anchorage securing and carrying said eyelet members in relative position, and the length of cord turned or looped under said securing portions of the eyelets and laid over itself at said loop at an angle to the annulus of the tire.

6. In anchoring means for the cord body fabric of tires of the "cord" type, eyelet members comprising a body loop or eye positioned transversely of the annulus of the tire and having their terminal ends forming eyes or securing portions positioned approximately parallel to the annulus of the tire, a base anchorage securing and carrying said eyelet members in relative position, and the length of cord turned or looped under said securing portions of the eyelets and laid over itself at said loop at an angle to the annulus of the tire.

7. In anchoring means for the cord body fabric of tires of the "cord" type, eyelet members in spaced series and having their terminal ends in projective position approximately parallel to the annulus of the tire, the spaced position being such that said end of one eyelet in conjunction with the next adjoining eyelet forms substantially a closure or securing eye, a base anchorage securing and carrying said eyelet members in said spaced and relative position, and the length of cord turned or looped through said securing eyes and laid over itself at said loop at an angle to the annulus of the tire.

8. In anchoring means for the cord body fabric of tires of the "cord" type, a bead ring member in line with the annulus of the tire, eyelet members carried by the bead ring member and having their terminal ends turned in reverse directions and in projective position approximately parallel to the annulus of the tire to form reversely-directed securing portions or eyes, and the length of cord of respective plies of the cord body fabric turned or looped under said securing ends of the eyelets which are projective in the same direction and laid over itself at said loop at an angle to the annulus of the tire.

9. In anchoring means for the cord body fabric of tires of the "cord" type, a bead ring member in line with the annulus of the tire, eyelet members in series and straddling or bridging the bead ring member transversely of the annulus of the tire and having their terminal ends turned in reverse directions to form securing portions or eyes positioned approximately parallel to the annulus of the tire, and the length of cord of respective plies of the cord body fabric turned or looped under said securing ends of the eyelets which are projective in the same direction and laid over itself at said loop at an angle to the annulus of the tire.

10. In anchoring means for the cord body fabric of tires of the "cord" type, a bead ring member in line with the annulus of the tire, eyelet members carried by the bead ring member in spaced series and having their terminal ends in reverse projective position approximately parallel to the annulus of the tire, the spaced position being such that said end of one eyelet in conjunction with the next adjoining eyelet forms substantially a closure or securing eye, and the length of cord of respective plies of the cord body fabric turned or looped under said securing ends of the eyelets which are projective in the same direction and laid over itself at said loop at an angle to the annulus of the tire.

11. In anchoring means for the cord body fabric of tires of the "cord" type, an anchor base comprising eyelet members in series and having their securing portions or eyes positioned approximately parallel to the annulus of the tire, and a bead-member extending in parallel relationship to the annulus of the tire and securing and carrying said eyelet members in series and in relative position.

In testimony whereof I have signed the foregoing specifications.

FREDRICK S. DICKINSON.